US012178155B2

(12) United States Patent
Christiansen et al.

(10) Patent No.: US 12,178,155 B2
(45) Date of Patent: Dec. 31, 2024

(54) SYSTEM AND METHOD OF ASSISTED OR AUTOMATED GRAIN UNLOAD SYNCHRONIZATION

(71) Applicant: AGCO International GmbH, Neuhausen (CH)

(72) Inventors: Martin Peter Christiansen, Randers (DK); Ramon Buchaca Tarragona, Randers (DK); Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 776 days.

(21) Appl. No.: 17/377,357

(22) Filed: Jul. 15, 2021

(65) Prior Publication Data

US 2022/0015289 A1    Jan. 20, 2022

(30) Foreign Application Priority Data

Jul. 17, 2020   (GB) ..................... 2011037

(51) Int. Cl.
*A01D 41/12*   (2006.01)
*A01D 41/127*  (2006.01)
(Continued)

(52) U.S. Cl.
CPC ........... *A01D 41/127* (2013.01); *A01D 90/10* (2013.01); *G06T 7/73* (2017.01); *G06T 2200/24* (2013.01); *G06T 2207/30204* (2013.01)

(58) Field of Classification Search
CPC ........ A01D 41/127; A01D 90/10; G06T 7/73; G06T 2200/24; G06T 2207/30204; A01B 69/008
See application file for complete search history.

(56) References Cited

U.S. PATENT DOCUMENTS

2003/0174207 A1   9/2003  Alexia et al.
2014/0311113 A1*  10/2014 Bonefas ............... A01D 34/001
                                                56/10.2 R
2021/0337729 A1*  11/2021 O'Connor ............. B60W 10/30

FOREIGN PATENT DOCUMENTS

DE   102011052688 A1    2/2013
EP      3289852 A1  *   3/2018

OTHER PUBLICATIONS

UK Intellectual Property Office, Search Report for related UK Application No. GB2011037.5, dated Jan. 19, 2021.

* cited by examiner

*Primary Examiner* — Rodney A Butler

(57) ABSTRACT

An agricultural harvester includes a crop processor for reducing crop material to processed crop, an unload conveyor for transferring a stream of processed crop out of the harvester, and a camera for capturing images of an area proximate the harvester and generating image data from the captured images. One or more computing devices are configured for receiving the image data from the camera, identifying, from the image data, a visual marker corresponding to a receiving vehicle, and determining, from the visual marker, a location of the receiving vehicle relative to the agricultural harvester. An electronic device presents, on a graphical user interface of the device, a graphical representation of the relative locations of the unload conveyor and at least a portion of the receiving vehicle, the graphical representation based on the location of the receiving vehicle relative to the agricultural harvester determined by the one or more computing devices.

19 Claims, 15 Drawing Sheets

(51) Int. Cl.
*A01D 90/10* (2006.01)
*G06T 7/73* (2017.01)

SYSTEM AND METHOD OF ASSISTED OR AUTOMATED GRAIN UNLOAD SYNCHRONIZATION

FIELD

Embodiments of the present invention relate to systems and methods for assisted or automatic synchronization of agricultural machine operations. More particularly, embodiments of the present invention relate to systems and methods for assisted or automatic synchronization of machine movement during transfer of crop material from one machine to another.

BACKGROUND

Combine harvesters are used in agricultural production to cut or pick up crops such as wheat, corn, beans and milo from a field and process the crop to remove grain from stalks, leaves and other material other than grain (MOG). Processing the crop involves gathering the crop into a crop processor, threshing the crop to loosen the grain from the MOG, separating the grain from the MOG and cleaning the grain. The combine harvester stores the clean grain in a clean grain tank and discharges the MOG from the harvester onto the field. The cleaned grain remains in the clean grain tank until it is transferred out of the tank through an unload conveyor into a receiving vehicle, such as a grain truck or a grain wagon pulled by a tractor.

To avoid frequent stops during a harvesting operation it is common to unload the grain from a harvester while the combine harvester is in motion harvesting crop. Unloading the harvester while it is in motion requires a receiving vehicle to drive alongside the combine harvester during the unload operation. This requires the operator driving the receiving vehicle to align a grain bin of the receiving vehicle with the spout of an unload conveyor of the combine for the duration of the unload operation. Aligning the two vehicles in this manner is laborious for the operator of the receiving vehicle and, in some situations, can be particularly challenging. Some circumstances may limit the operator's visibility, for example, such as where there is excessive dust in the air or at nighttime. Furthermore, if the receiving vehicle has a large or elongated grain bin, such as a large grain cart or a grain truck, it is desirable to shift the position of the grain bin relative to the spout during the unload operation to evenly fill the grain bin and avoid spilling grain.

Forage harvesters also process crop but function differently from combine harvesters. Rather than separating grain from MOG, forage harvesters chop the entire plant—including grain and MOG—into small pieces for storage and feeding to livestock. Forage harvesters do not store the processed crop onboard the harvester during the harvest operation, but rather transfer the processed crop to a receiving vehicle by blowing the crop material through a discharge chute to the receiving vehicle, such as a silage wagon pulled by a tractor, without storing it on the harvester. Thus, a receiving vehicle must closely follow the forage harvester during the entire harvester operation. This presents similar challenges to those discussed above in relation to the combine harvester.

The above section provides background information related to the present disclosure which is not necessarily prior art.

SUMMARY

A system according to a first embodiment of the invention comprises an agricultural harvester including a crop processor for reducing crop material to processed crop, an unload conveyor for transferring a stream of processed crop out of the agricultural harvester, and a camera for capturing images of an area proximate the agricultural harvester and generating image data from the captured images. One or more computing devices are configured for receiving the image data from the camera, identifying, from the image data, a visual marker corresponding to a receiving vehicle, and determining, from the visual marker, a location of the receiving vehicle relative to the agricultural harvester. An electronic device includes a graphical user interface and presents, on the graphical user interface, a graphical representation of the relative locations of the unload conveyor and at least a portion of the receiving vehicle, wherein the graphical representation is based on the location of the receiving vehicle relative to the agricultural harvester determined by the one or more computing devices.

A system according to another embodiment comprises an agricultural harvester including a crop processor for reducing crop material to processed crop, an unload conveyor for transferring a stream of processed crop out of the agricultural harvester, a first controller, a first communications gateway for sending and receiving wireless signals, and a camera for capturing images of an area proximate the agricultural harvester and generating image data. A receiving vehicle includes a grain bin for storing processed crop received from the agricultural harvester, a visual marker, a second controller, and a second communications gateway for sending and receiving wireless signals.

The first controller is configured for receiving the image data from the camera, identifying, from the image data, the visual marker, generating, from the visual marker, location data indicating a location of the receiving vehicle relative to the agricultural harvester, and communicating the location data to the receiving vehicle using the first communications gateway. The second controller is configured for receiving the location data using the second communications gateway, and using the location data to generate a graphical representation of the relative locations of the unload conveyor and at least a portion of the receiving vehicle, the graphical representation based on the location data.

A method according to another embodiment comprises capturing images of an area proximate an agricultural harvester using a camera on the agricultural harvester and generating image data from the capture images; identifying from the image data, using one or more computing devices, a visual marker corresponding to a receiving vehicle; determining from the visual marker, using the one or more computing devices, a location of the receiving vehicle relative to the agricultural harvester; and generating, using the one or more computing devices, a graphical representation of the relative locations of the unload conveyor and at least a portion of the receiving vehicle, the graphical representation based on the location of the receiving vehicle relative to the agricultural harvester.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
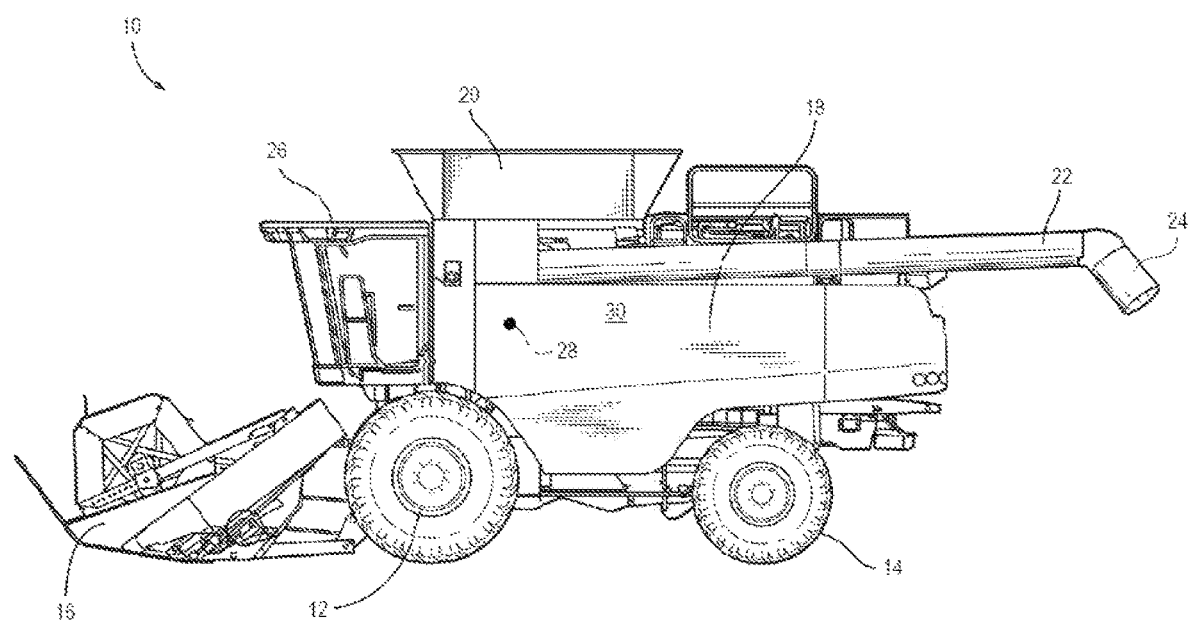
FIG. 1 is an agricultural harvester constructed in accordance with an embodiment of the invention.
Figure 4:
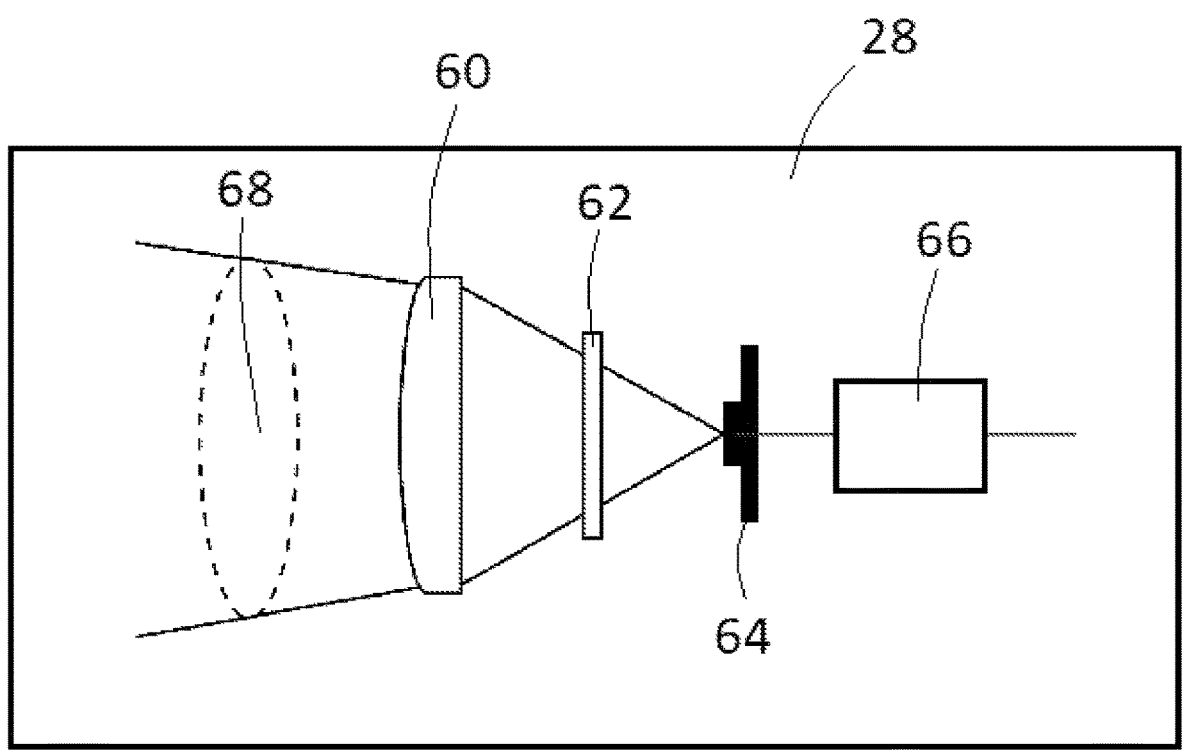
FIG. 4 is a diagram of certain components of a camera used on the combine of FIG. 1.

FIGS. 6-9 depiction images captured by the camera of FIG. 4 when mounted the harvester of FIG. 1.

Figure 10:
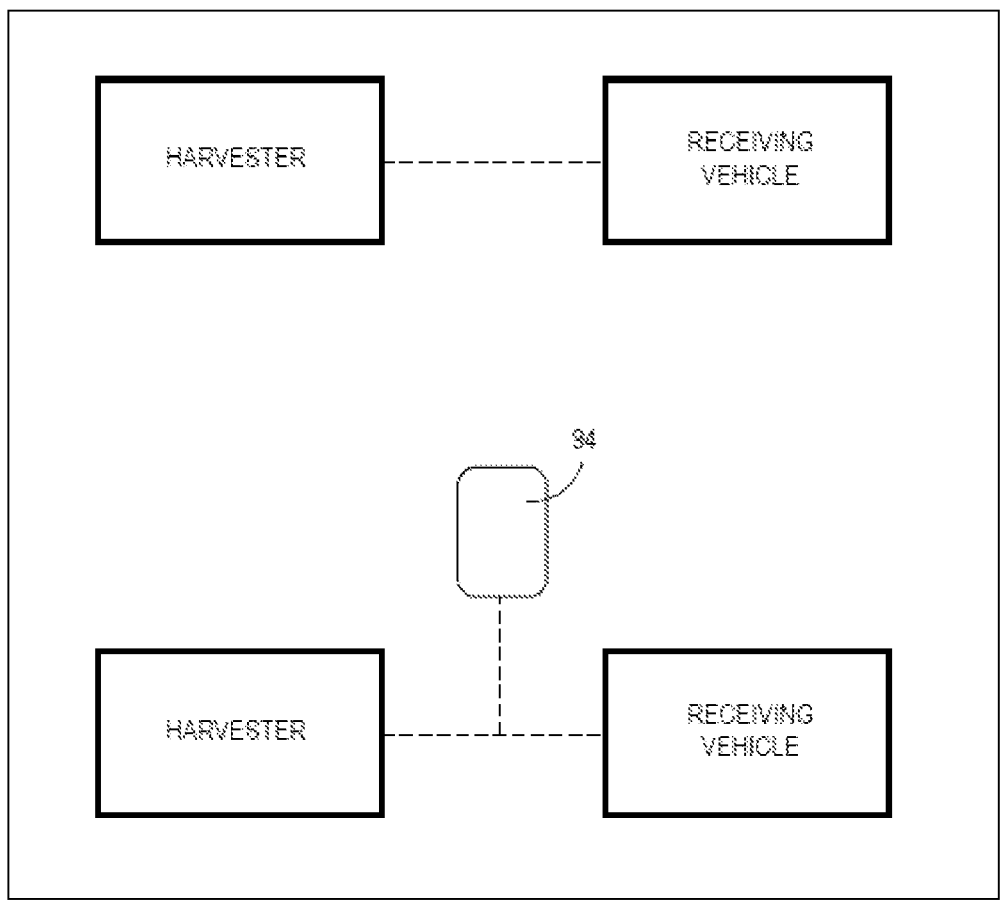

FIG. 10 is a diagram illustrating an embodiment wherein the agricultural harvester shares data wirelessly with the receiving vehicle and another embodiment wherein the agricultural harvester shares data wirelessly with the receiving vehicle and a portable electronic device.

Figure 11:
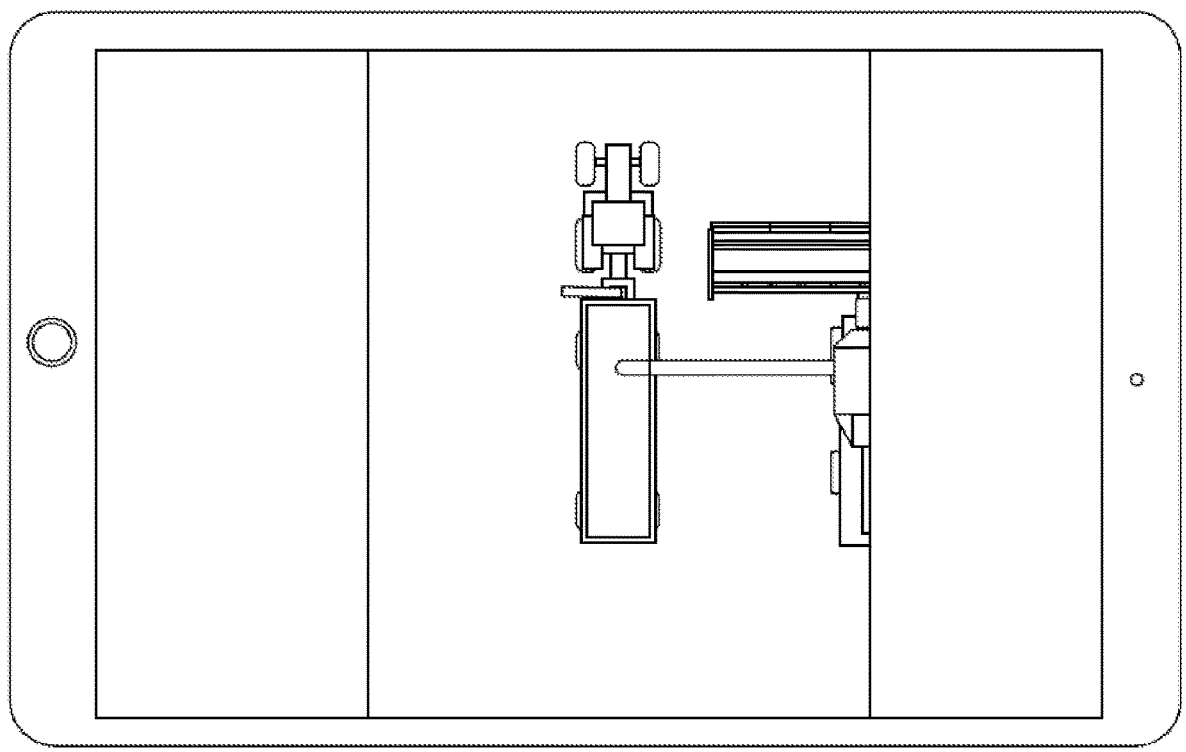

FIG. 11 illustrates a first graphical user interface including a graphical representation of the relative positions of the agricultural harvester and the receiving vehicle.

Figure 12:
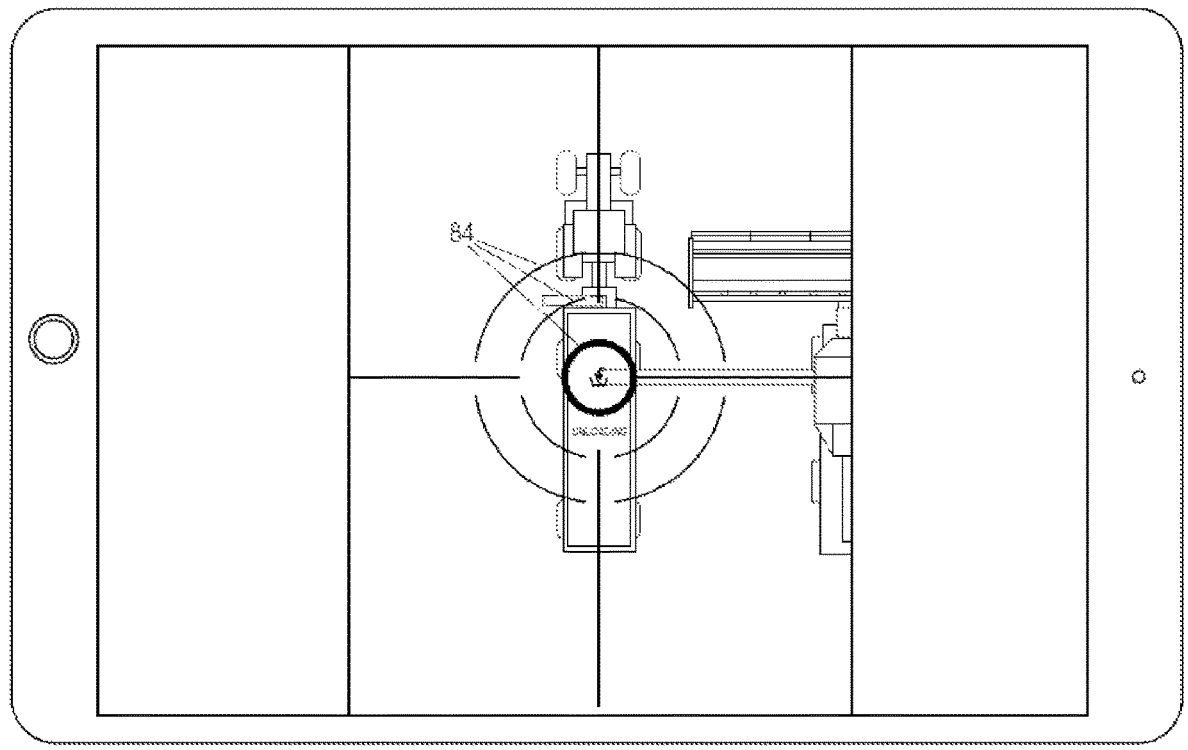

FIG. 12 illustrates a second graphical user interface including a graphical representation of the relative positions of the agricultural harvester and the receiving vehicle.

Figure 13:
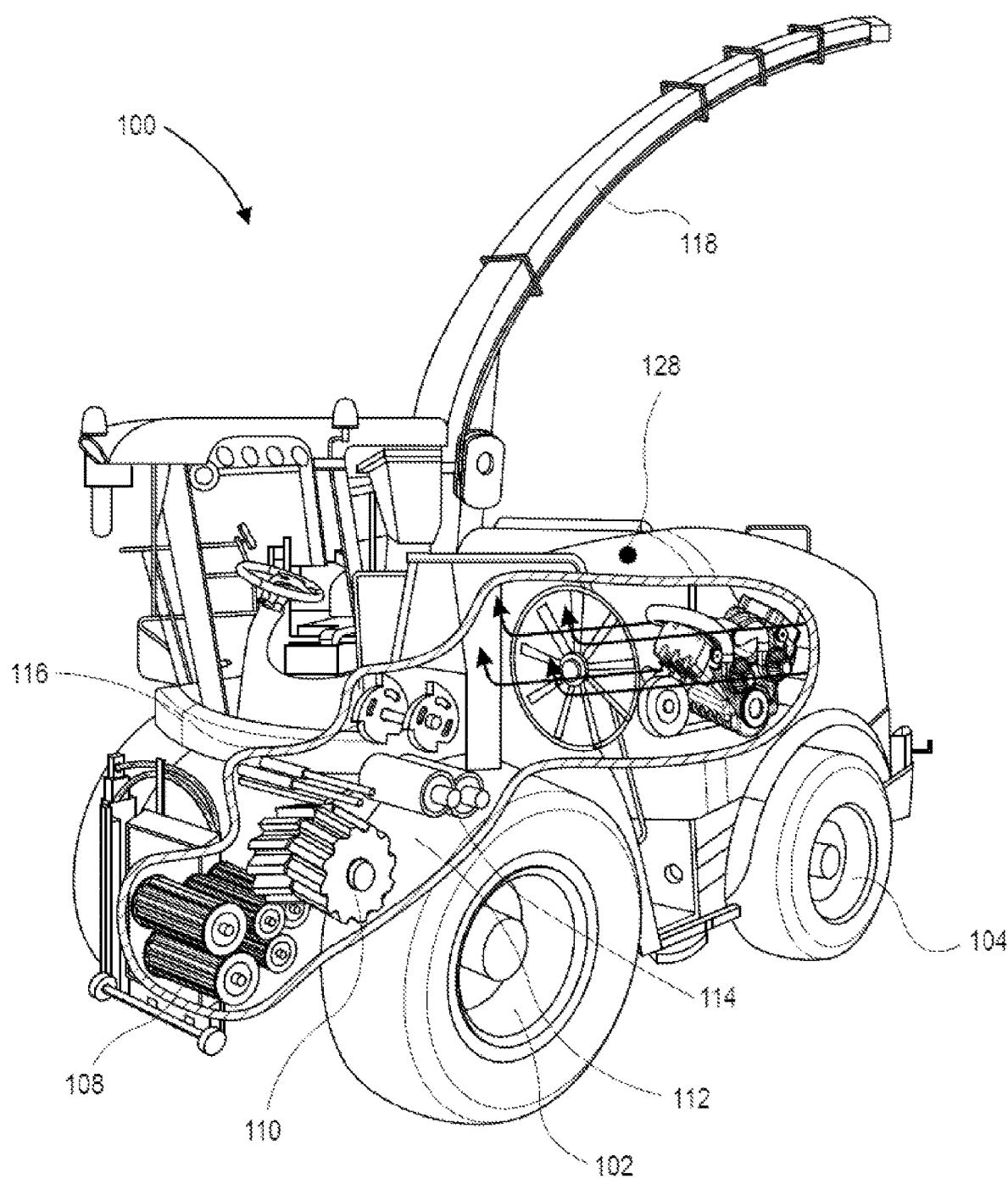

FIG. 13 is another agricultural harvester constructed according to embodiments of the invention in the form of a forage harvester.

Figure 14:
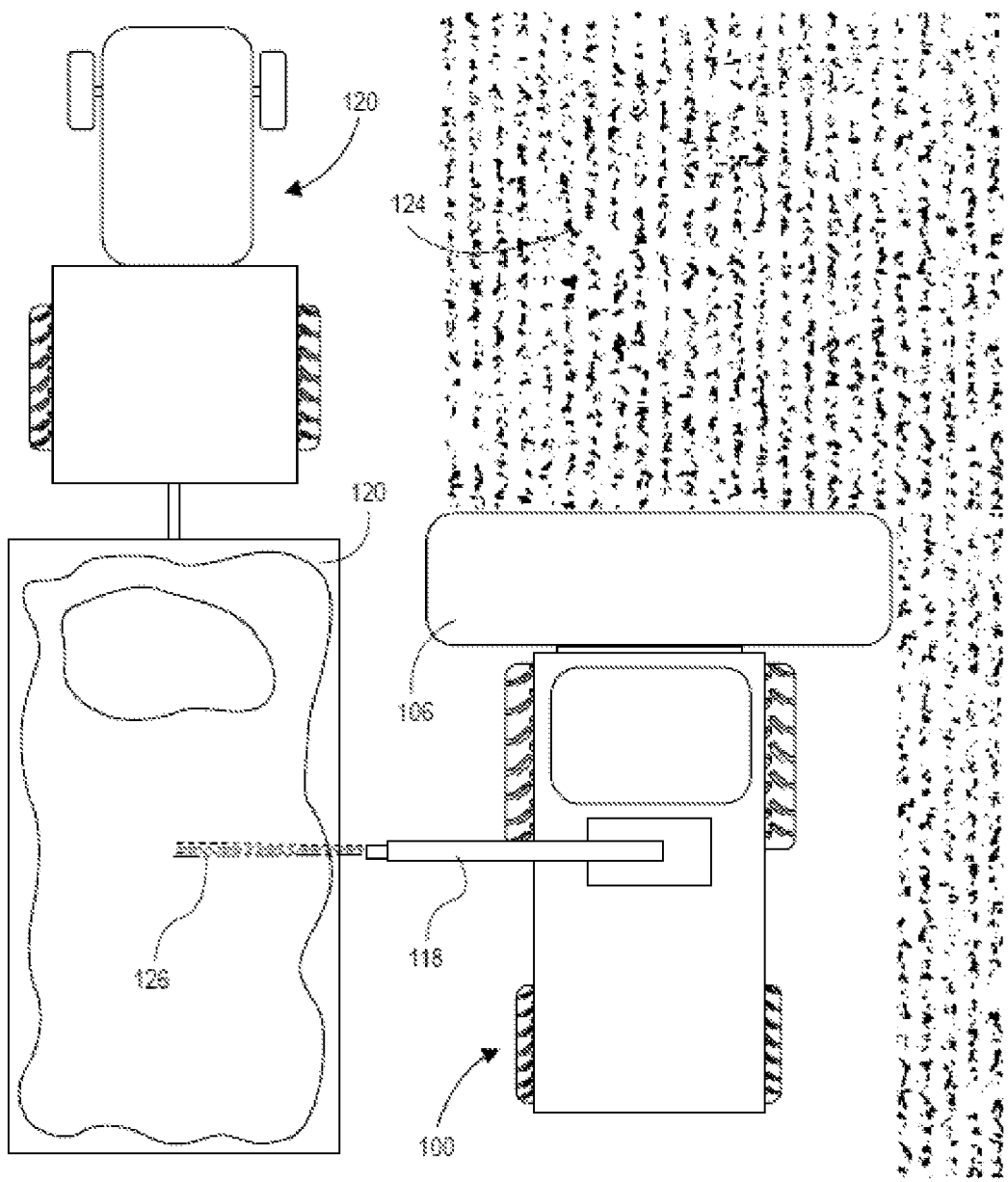

FIG. 14 illustrates the agricultural harvester of FIG. 13 harvesting crop and transferring a stream of processed crop into a receiving vehicle.

Figure 15:
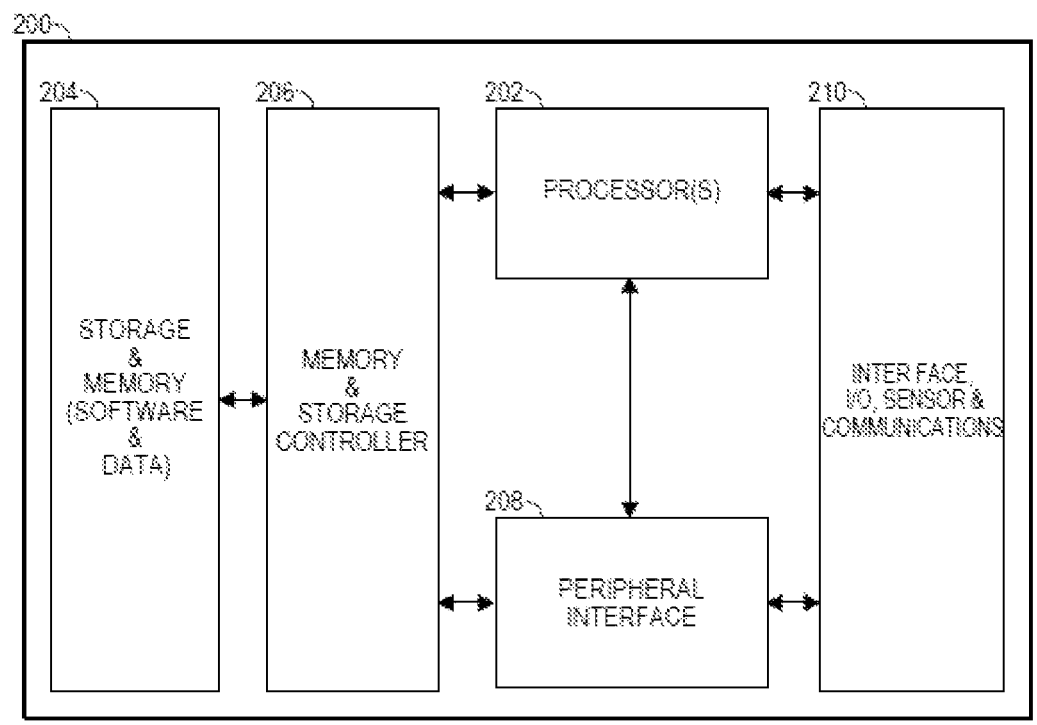

FIG. 15 is a block diagram of certain components of a portable electronic device.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

Given the challenges of synchronizing operation of harvesters and receiving vehicles during unload operations it is desirable to assist machine operators in manually controlling the machines or to fully automate movement of at least one of the harvester and the receiving vehicle to maintain the desired relative positions of the two vehicles. Assisting operation and fully automating movement of at least one of the machines in this way requires continuously generating position data, in real time or nearly in real time, indicating the relative positions of the machines. Generating and communicating position data presents various technical challenges that make it difficult to reliably acquire accurate position data. During harvest operations, for example, the machines operate in remote locations where data communications with external networks, such as the cellular communications network, are often limited or nonexistent; mountains, trees or other obstacles may limit the number of reliable GNSS satellite signals the machines can receive; harvesting environments are often dusty which can interfere with the operation of some types of sensors (such as optical sensors); harvesting operations may be performed at various times throughout the day (and even at nighttime) that present different and sometimes challenging ambient light situations that can limit the effectiveness of optical sensors; and harvesting operations may involve multiple harvesters and multiple receiving vehicles, wherein each harvester works with multiple receiving vehicles. Various embodiments of the present invention solve the technical problems associated with detecting the relative positions of the harvesters and receiving vehicles during unload operations and provide assisted or fully automated operation of at least one of the machines to synchronize movement during unload operations.

A system according to a first embodiment of the invention comprises an agricultural harvester, one or more computing devices and an electronic device with a graphical user interface. The agricultural harvester includes a crop processor for reducing crop material to processed crop, an unload conveyor for transferring a stream of processed crop out of the agricultural harvester and a camera for capturing images of an area proximate the agricultural harvester and generating image data from the captured images. The one or more computing devices are configured for receiving the image data from the camera, identifying, from the image data, a visual marker corresponding to a receiving vehicle, and determining, from the visual marker, a location of the receiving vehicle. The an electronic device presents, on the graphical user interface, a graphical representation of the relative locations of the unload conveyor and at least a portion of the receiving vehicle, the graphical representation based on the location of the receiving vehicle determined by the one or more computing devices.

Figure 2:
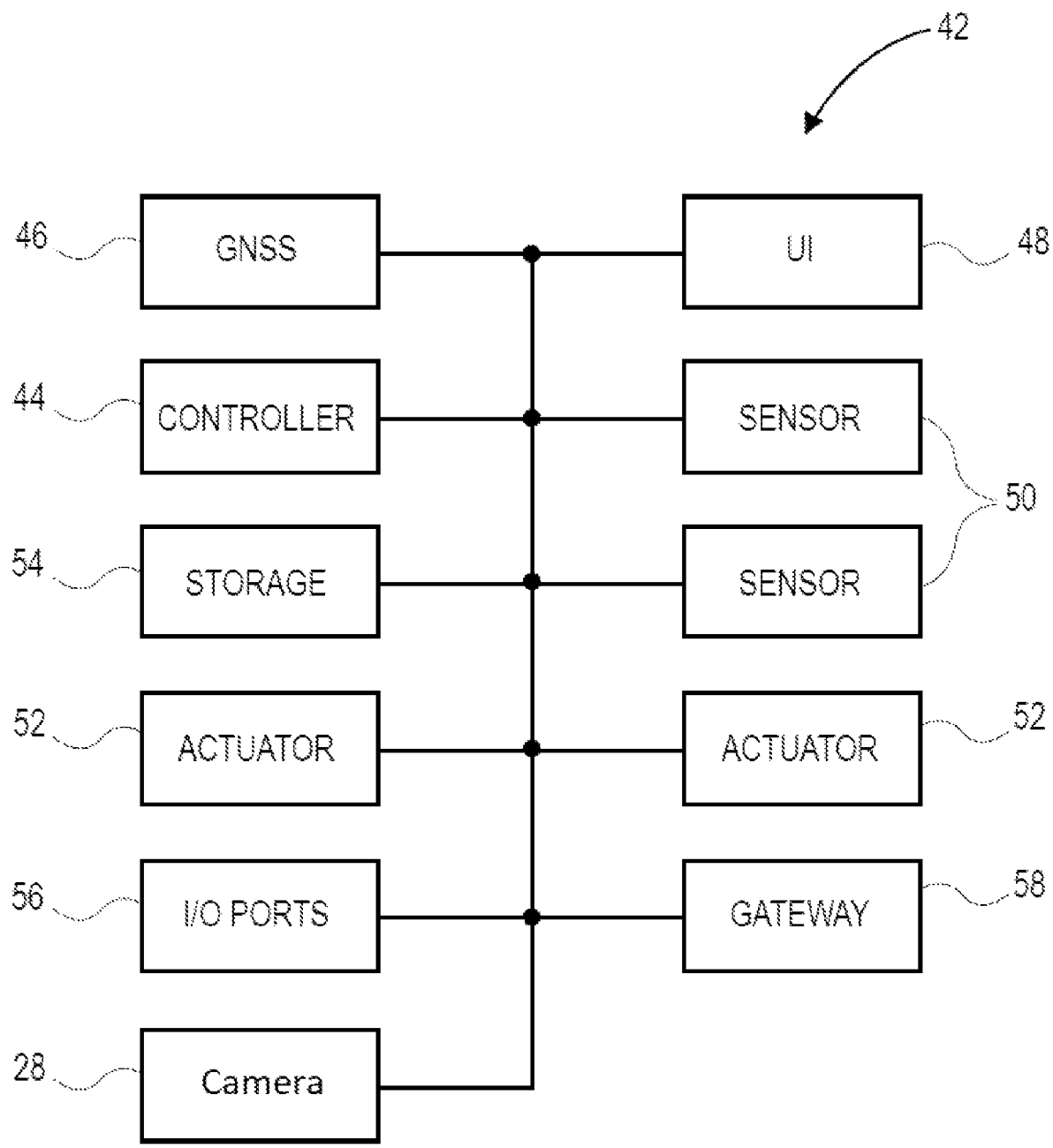
FIG. 2 is a block diagram of an electronic system of the agricultural harvester of FIG. 1.
Figure 3:
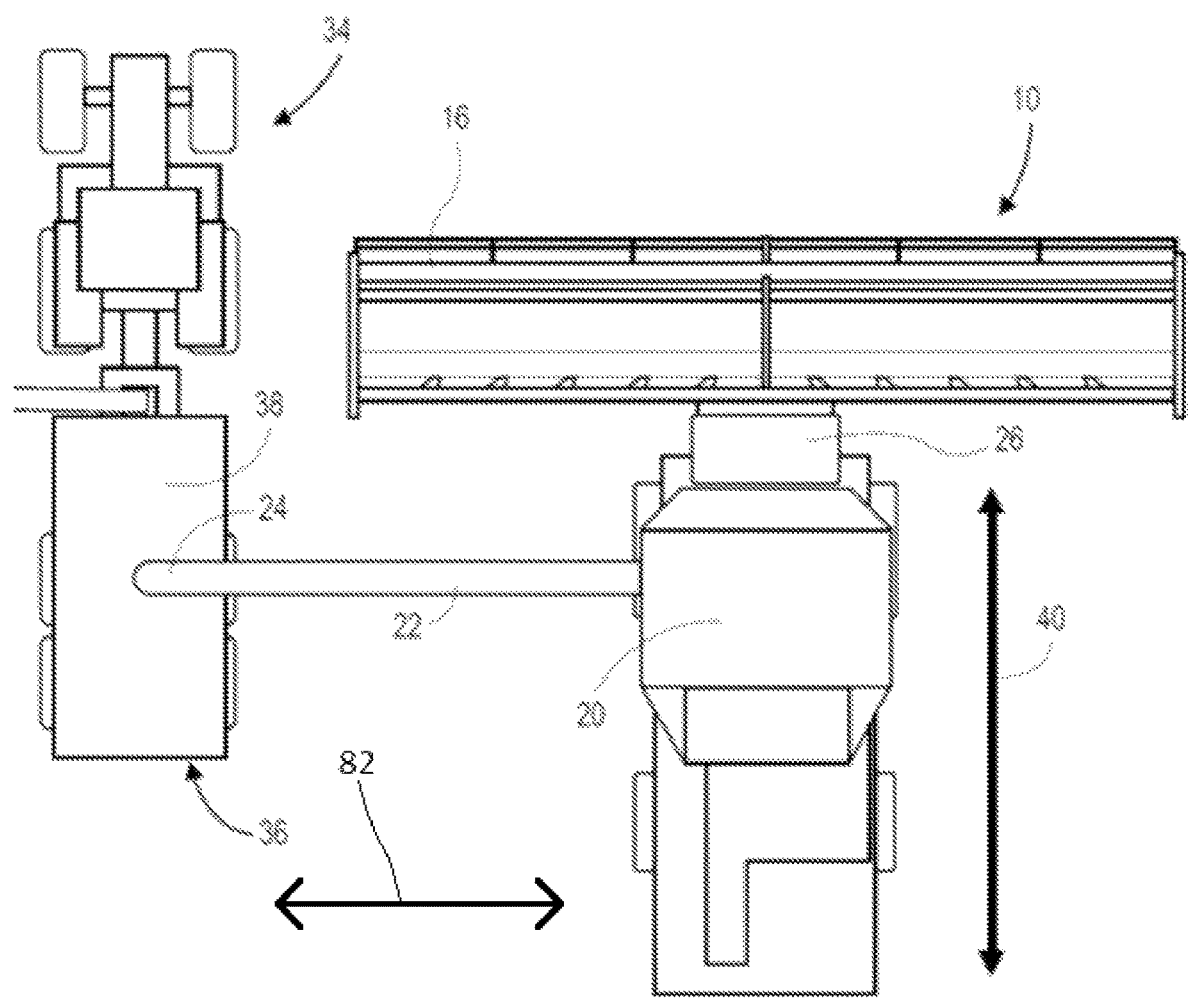
FIG. 3 is illustrates the agricultural harvester of FIG. 1 and a receiving vehicle, with the agricultural harvester in position to transfer grain to the receiving vehicle.

Turning now to the drawing figures, and initially FIGS. 1-3, an agricultural harvester 10 constructed in accordance with the first embodiment is illustrated. The harvester 10 is a combine harvester that cuts or picks up crop from a field, threshes the crop to loosen the grain from material other than grain (MOG), separates the grain from the MOG, cleans the grain, stores the clean grain in a clean grain tank and transfers the clean grain out of the clean grain tank to a receiving vehicle or other receptacle. The illustrated harvester 10 includes a pair of front wheels 12 and a pair of rear wheels 14 that support the harvester 10 on a ground surface, propel it along the ground surface and provide steering. A header 16 cuts crop standing in a field (or picks up crop that was previous cut) as the harvester 10 moves through the field and gathers the cut crop to be fed to a processor housed within a body 18 of the harvester 10.

The processor threshes the grain, separates the grain from the MOG, cleans the grain and stores the grain in a clean grain tank 20. Thus, the processor reduces crop material (plants or portions of plants cut or picked up from the field) to processed crop (grain). An unload conveyor 22 transfers grain from the clean grain tank 20 to a receiving vehicle or other receptacle using one or more augers, belts or similar mechanisms to move grain out of the clean grain tank 20, through the unload conveyor 22 and out a spout 24 positioned at an end of the unload conveyor 22 distal the body 18 of the harvester 10. The unload conveyor 22 is illustrated in a stowed position in FIG. 1 used when the harvester 10 is not transferring grain out of the grain tank 20. The unload conveyor 22 is moveable between the stowed position and a deployed position, illustrated in FIG. 3, used to transfer grain from the grain tank 20 to a receiving vehicle or other receptacle. The receiving vehicle illustrated in FIG. 3 is a tractor 34 and grain cart 36 combination. The grain cart 36 includes a grain bin 38 for holding crop transferred out of the harvester 10. When the unload conveyor 22 is in the deployed position it is generally perpendicular to a longitudinal axis of the harvester 10, the longitudinal axis being parallel with line 40. When the unload conveyor 22 is in the fully stowed position (FIG. 1) it is generally parallel with the longitudinal axis of the harvester.

An operator cabin 26 includes a seat and a user interface for enabling an operator to control various aspects of the harvester 10. The user interface includes mechanical components, electronic components, or both such as, for example, knobs, switches, levers, buttons, dials as well as electronic touchscreen displays that both present information to the operator in graphical form and receive information from the operator. The use interface is described further below as part of the electronic system 42 of the harvester 10. The harvester 10 includes a camera 32 mounted on an exterior surface 30 of the combine body 18. The camera 28 is configured and positioned for capturing images of an area proximate the agricultural harvester 10 and generates image data, as explained below. In the embodiment illustrated in FIG. 1, the camera 28 is mounted on the exterior surface 30 (being on the same side of the harvester 10 as the unload conveyor 22) between one meter and four meters from the ground. In another embodiment of the invention, the camera 28 is mounted on the surface 30 between one and one-half meters and three meters from the ground. It will be appreciated that the precise location of the camera 28 is not critical and that the camera 28 may be place in other, equally-preferred locations.

The harvester 10 includes an electronic system 42 illustrated in FIG. 2. The system 42 broadly includes a controller 44, a position determining device 46, a user interface 48, one or more sensors 50, one or more actuators 52, one or more storage components 54, one or more input/out ports 56, a communications gateway 58 and the camera 28.

The position determining device 46 includes a global navigation satellite system (GNSS) receiver, such as a device configured to receive signals from one or more positioning systems such as the United States' global positioning system (GPS), the European GALILEO system and/or the Russian GLONASS system, and to determine a location of the machine using the received signals. The user interface 48 includes components for receiving information, instructions or other input from a user and may include buttons, switches, dials, and microphones, as well as components for presenting information or data to users, such as displays, light-emitting diodes, audio speakers and so forth. The user interface 48 may include one or more touchscreen displays capable of presenting visual representations of information or data and receiving instructions or input from the user via a single display surface.

The sensors 50 may be associated with any of various components or functions of the harvester 10 including, for example, various elements of the engine, transmission(s), and hydraulic and electrical systems. One or more of the sensors 50 may be configured and placed to detect environmental or ambient conditions in, around or near the harvester 10. Such environmental or ambient conditions may include temperature, humidity, wind speed and wind direction. The actuators 52 are configured and placed to drive certain functions of the harvester 10 including, for example, moving the unload conveyor 22 between the stowed and deployed positions, driving an auger or belt associated with the unload conveyor 22 and steering the rear wheels 14. The actuators 52 may take virtually any form but are generally configured to receive control signals or instructions from the controller 44 (or other component of the system 42) and to generate a mechanical movement or action in response to the control signals or instructions. By way of example, the sensors 50 and actuators 52 may be used in automated steering of the harvester 10 wherein the sensors 50 detect a current position or state of the steered wheels 14 and the actuators 52 drive steering action of the wheels 14. In another example, the sensors 50 collect data relating to the operation of the harvester 10 and store the data in the storage component 54, communicate the data to a remote computing device via the communications gateway 58, or both.

The controller 44 is a computing device and includes one or more integrated circuits programmed or configured to implement the functions described herein and associated with the harvester 10. By way of example the controller 44 may be a digital controller and may include one or more general purpose microprocessors or microcontrollers, programmable logic devices, application specific integrated circuits or other computing devices. The controller 44 may include multiple computing components, such as electronic control units, placed in various different locations on the harvester 10, and may include one or more computing devices connected to the system 42 through the I/O ports 56. The controller 44 may also include one or more discrete and/or analog circuit components operating in conjunction with the one or more integrated circuits or computing components. Furthermore, the controller 44 may include or have access to one or more memory elements operable to store executable instructions, data, or both. The storage component 54 stores data and preferably includes a non-volatile storage medium such as solid state, optic or magnetic technology.

The communications gateway 58 includes one or more wireless transceivers configured to communicate with external machines or devices using wireless communications technology. The communications gateway 58 may include one or more wireless transceivers configured to communicate according to one or more wireless communications protocols or standards, such as one or more protocols based on the IEEE 802.11 family of standards ("Wi-Fi"), the Bluetooth wireless communications standard, a 433 MHz wireless communications protocol or a protocol for communicating over a cellular telephone network. Alternatively or additionally, the communications gateway 58 may include one or more wireless transceivers configured to communicate according to one or more proprietary or non-standardized wireless communication technologies or protocols, such as proprietary wireless communications protocols using 2.4 GHz or 5 GHz radio signals. Thus, the communications gateway 58 enables wireless communications with other machines such as other harvesters or tractors, with external devices such as laptop or tablet computers or smartphones, and with external communications networks such as a cellular telephone network or Wi-Fi network.

It will be appreciated that, for simplicity, certain elements and components of the system 42 have been omitted from the present discussion and from the diagram illustrated in FIG. 2. A power source or power connector is also associated with the system 42, for example, but is conventional in nature and, therefore, is not discussed herein.

In the illustrated embodiment all of the components of the system 42 are contained on or in the harvester 10. The present invention is not so limited, however, and in other embodiments one or more of the components of the system 42 may be external to the harvester 10. In one embodiment, for example, some of the components of the system 42 are contained on or in the harvester 10 while other components of the system are contained on or in an implement associated with the harvester 10. In that embodiment, the components associated with the harvester 10 and the components associated with the implement may communicate via wired or wireless communications according to a local area network such as, for example, a controller area network. The system may be part of a communications and control system conforming to the ISO 11783 (also referred to as "ISOBUS") standard. In yet another embodiment, one or more components of the system 42 may be located separately or remotely from the harvester 10 and any implements associated with the harvester 10. In that embodiment, the system 42 may include wireless communications components (e.g., the gateway 58) for enabling the harvester 10 to communicate with another machine or a remote computer, computer network or system. It may be desirable, for example, to use one or more computing devices external to the harvester 10 to determine, or assist in determining, the location of a receiving vehicle, a fill level of the receiving vehicle and/or the distribution of processed crop in the receiving vehicle, as explained below.

In this first embodiment the one or more computing devices has reference to the controller 44, including multiple devices that, taken together, may constitute the controller 44 as explained above. It will be appreciated, though, that in other embodiments the one or more computing devices may be separate from, but in communication with, the harvester 10. In those embodiments the one or more computing devices may include computing devices associated with a portable electronic device, such as a laptop computer, a tablet computer or a smartphone, may include computing devices embedded in another agricultural machine, such as a receiving vehicle, or both. Furthermore, in some embodiments the one or more computing devices may include computing devices from multiple machines or devices, such as a computing device on the harvester 10 and a computing device on the receiving vehicle. By way of example, a computing device on the harvester 10 may receive and process data from the camera 28 to generate location information and may communicate the location information to the tractor 34 via the communications gateway 58, wherein another computing device on the tractor 34 generates automated guidance data for guiding the tractor 34 or generates graphic data for presentation on a user interface in the tractor 34. In that scenario the one or more computing devices comprise both the computing device on the harvester 10 and the computing device on the tractor 34.

The tractor 34 also includes an electronic system similar to the system 42 of the harvester 10, except that the electronic system of the tractor 34 does not include electromagnetic detecting and ranging modules. The electronic system of the tractor 34 broadly includes a controller, a position determining device, a user interface, one or more sensors, one or more actuators, one or more storage components, one or more input/out ports a communications gateway similar or identical to those described above as part of the system 42.

The camera 28 is positioned and configured for capturing images of objects that are proximate the harvester 10. The camera 28 is located on the exterior side surface 30 of the body 18 of the harvester 10, as explained above, and has a field of view extending outwardly from the side surface 30 and with a center of the field of view being perpendicular or approximately perpendicular to the longitudinal axis of the harvester 10. This corresponds to an area in which a receiving vehicle is located during crop transfer operations.

A diagram of certain components of the camera 28 is illustrated in FIG. 4 and includes one or more lenses 60, an optional filter 62, a detector 64, and processing circuitry 66. The one or more lenses 60 collect and direct light from a field of view 68 through the filter 62 to the detector 64 and serve to focus and/or magnify images. The filter 62 passes select spectral bands such as ultraviolet, infrared or other bands. In some embodiments the camera 28 does not have a filter 62. The detector 64 is a digital image sensor that converts electromagnetic energy to an electric signal and employs image sensing technology such as charge-coupled device (CCD) technology and/or complementary metal oxide semiconductor (CMOS) technology. The processing circuitry 66 includes circuitry for amplifying and processing the electric signal generated by the detector 64 to generated image data, which his passed to the one or more computing devices such as the controller 44. The camera 28 includes an enclosure to house and protect the other components from exposure to weather and other harsh conditions associated with harvesting operations.

Figure 5:
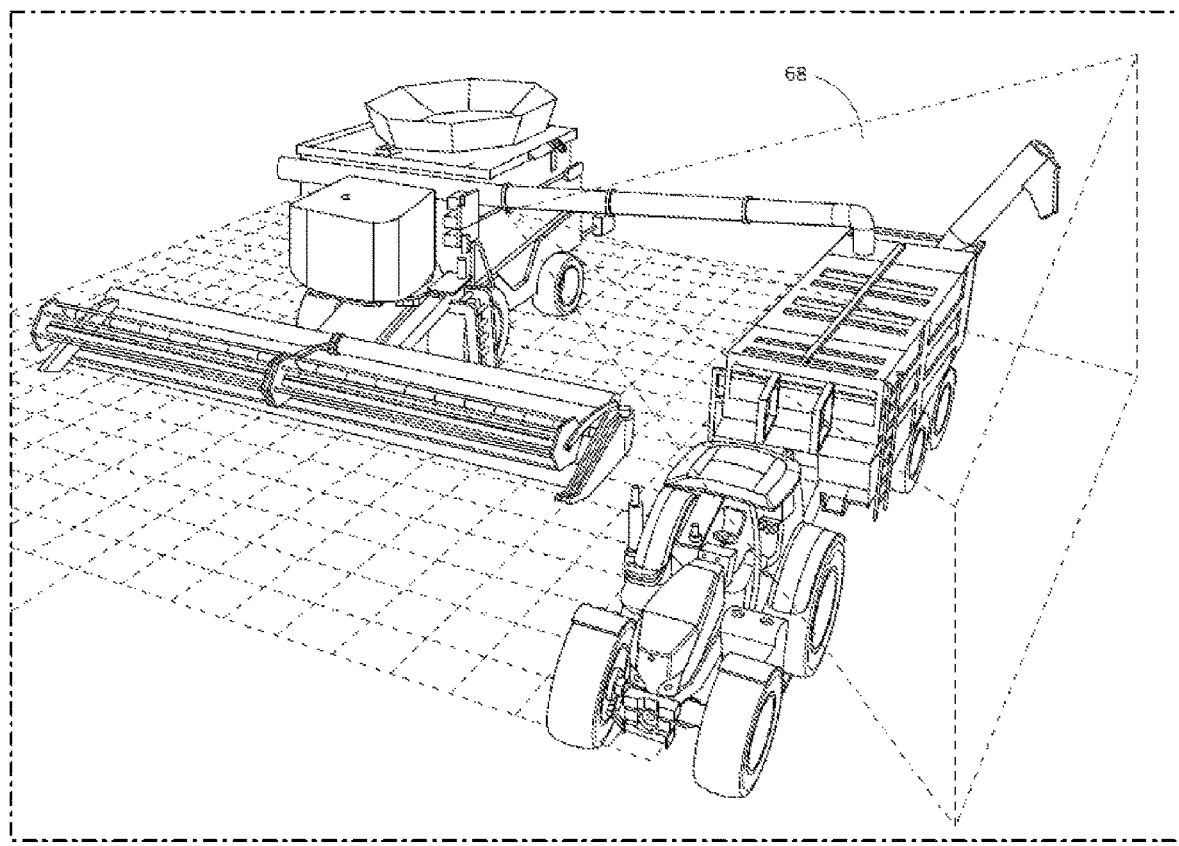
FIG. 5 is a perspective view of the agricultural harvester and receiving vehicle of FIG. 3 illustrating a field of view of the camera of FIG. 4 when mounted on the harvester of FIG. 1.
Figure 6:
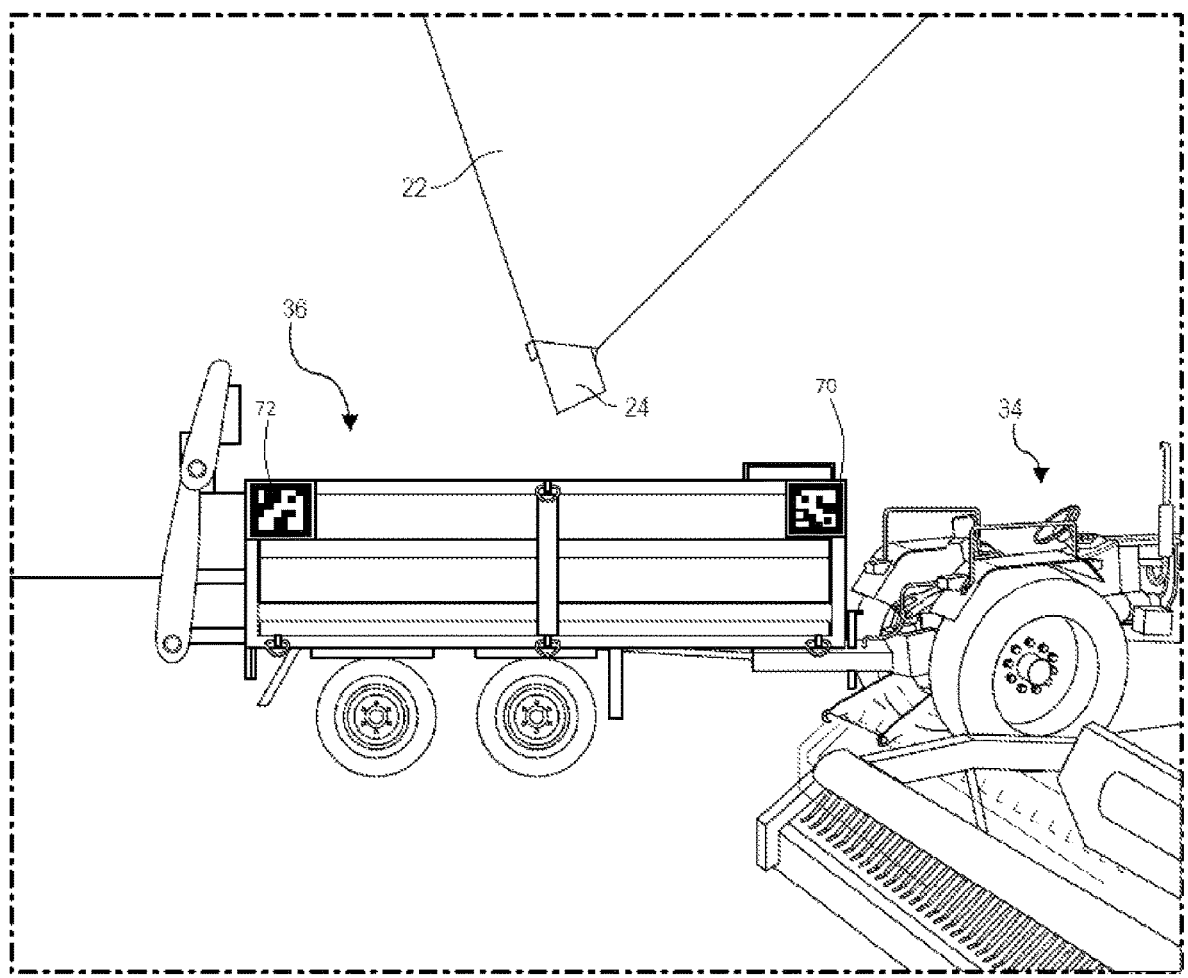

FIG. 5 illustrates the field of view 68 of the camera relative to the harvester 10, tractor and grain cart. An exemplary image taken from the camera 32 is illustrated in FIG. 6 and includes the tractor 34 and grain cart 36. The unload conveyor 22 and spout 24 are also visible in the image. A first marker 70 and a second marker 72 are on a side of the grain cart 36 facing the camera 28 and are used by the one or more computing devices to determine the location of the grain cart 36 relative to the agricultural harvester 10. The one or more computing devices may also use the markers 70, 72 to determine the orientation and/or size of the grain cart 36.

The first marker 70 is located at or near an upper front corner of the grain cart 36 and the second marker 72 is located at or near an upper rear corner of the grain cart 36. The markers 70, 72 contain a predetermined visual pattern or design that is included in images captured by the camera 28 and used by the one or more computing devices to recognize the markers 70, 72. The one or more computing devices search for and recognize the markers 70, 72 and use the location and size of the markers to determine information about the grain cart 36 including the location of the grain cart 36 relative to the agricultural harvester 10, the orientation of the grain cart 36 relative to the agricultural harvester 10 and the size of the grain cart 36.

The one or more computing devices use the size of the markers 70, 72 and the location of the markers 70, 72 in the image captured by the camera 28 to determine the location of the grain cart 36. The size of the markers 70, 72 in the image, such as the number of pixels corresponding to the width, the height and/or the area of the markers 70, 72, is used to determine a distance of each marker 70, 72 from the camera 28. Given that the actual size of the markers 70, 72 is fixed and known the distance of each marker can be correlated with the size of the marker in the image by, for example, using a lookup table to assign a distance to a size of the image in the marker. The one or more computing devices use the distance of the markers 70, 72 to the camera 28 to determine the lateral separation of the grain cart 36 from the harvester 10 or, in other words, the distance between the harvester 10 and the grain cart 36 along the direction 82 illustrated in FIG. 3.

The one or more computing devices also use the locations of the markers 70, 72 in the image to determine whether the grain cart 36 is behind, in front of or even with the unload conveyor 22 or, in other words, the position of the grain cart 36 relative to the unload conveyor 22 along the direction 40 illustrated in FIG. 3. In the image illustrated in FIG. 6 the grain cart 36 is approximately centered beneath the unload conveyor 22. If the grain cart 36 were further to the left in the image it would be behind the unload conveyor 22 and if it were further to the right in the image it would be in front of the unload conveyor 22. Thus, the sizes of the markers 70, 72 are used to determine the lateral (side-to-side) position of the grain cart 36 relative to the unload conveyor 22 (along direction 82) and the locations of the markers 70, 72 left to right in the image are used to determine the longitudinal (front-to-back) position of the grain cart 36 relative to the conveyor 22 (along direction 40).

The first marker 70 is located at or near a top front corner of the grain cart 36 and the second marker is located at or near a rear top corner of the grain cart 36. This enables the one or more computing devices to determine the size of the grain cart 36 using the distance of the markers 70, 72 from the camera 28 (determined by the size of the markers) and the distance between the markers 70, 72 (determine by the size and separation of the markers in the image). Both the location and size of the grain cart 36 may be used to generate a graphical representation of the relative positions of the unload conveyor 22 and the grain cart 36.

Figure 7:
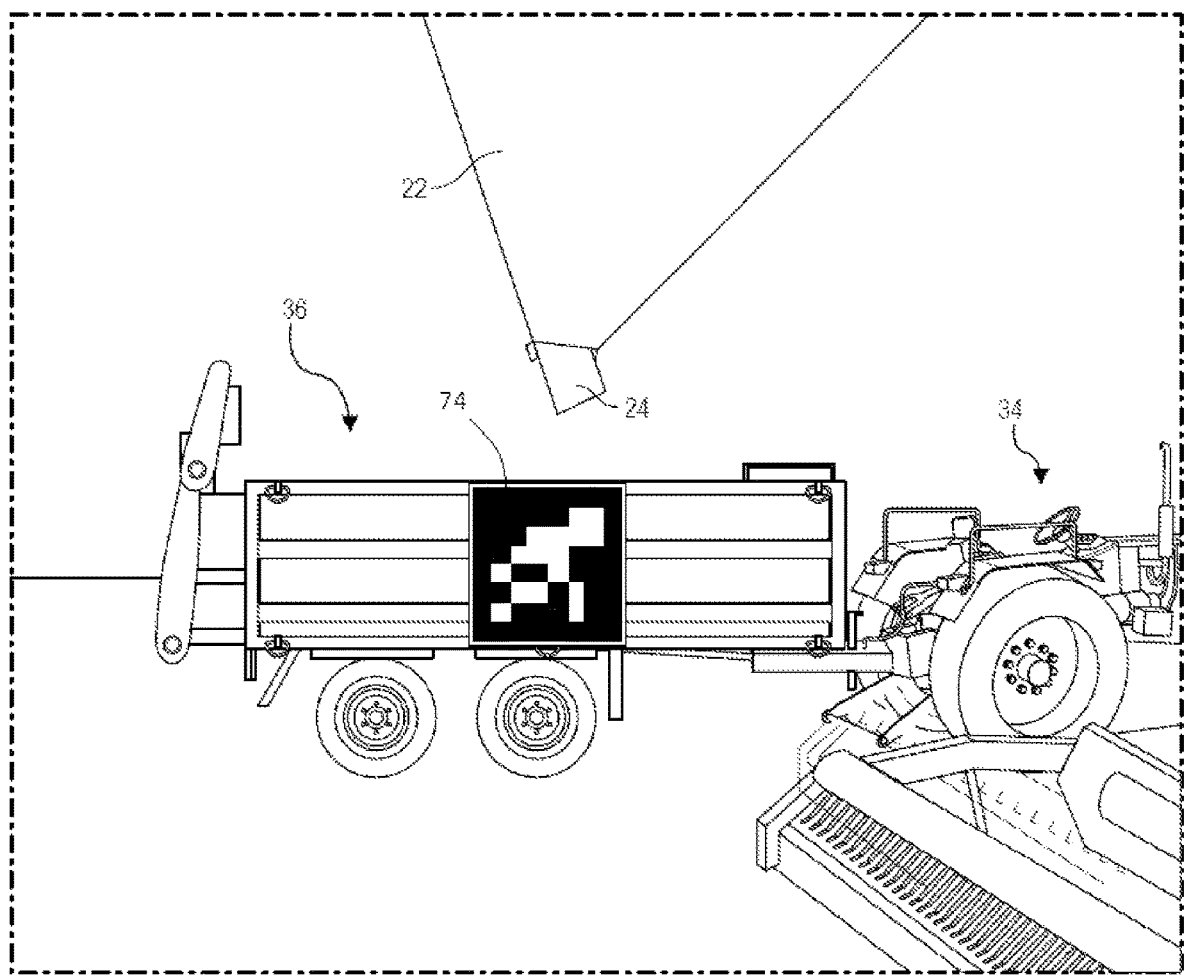
Figure 8:
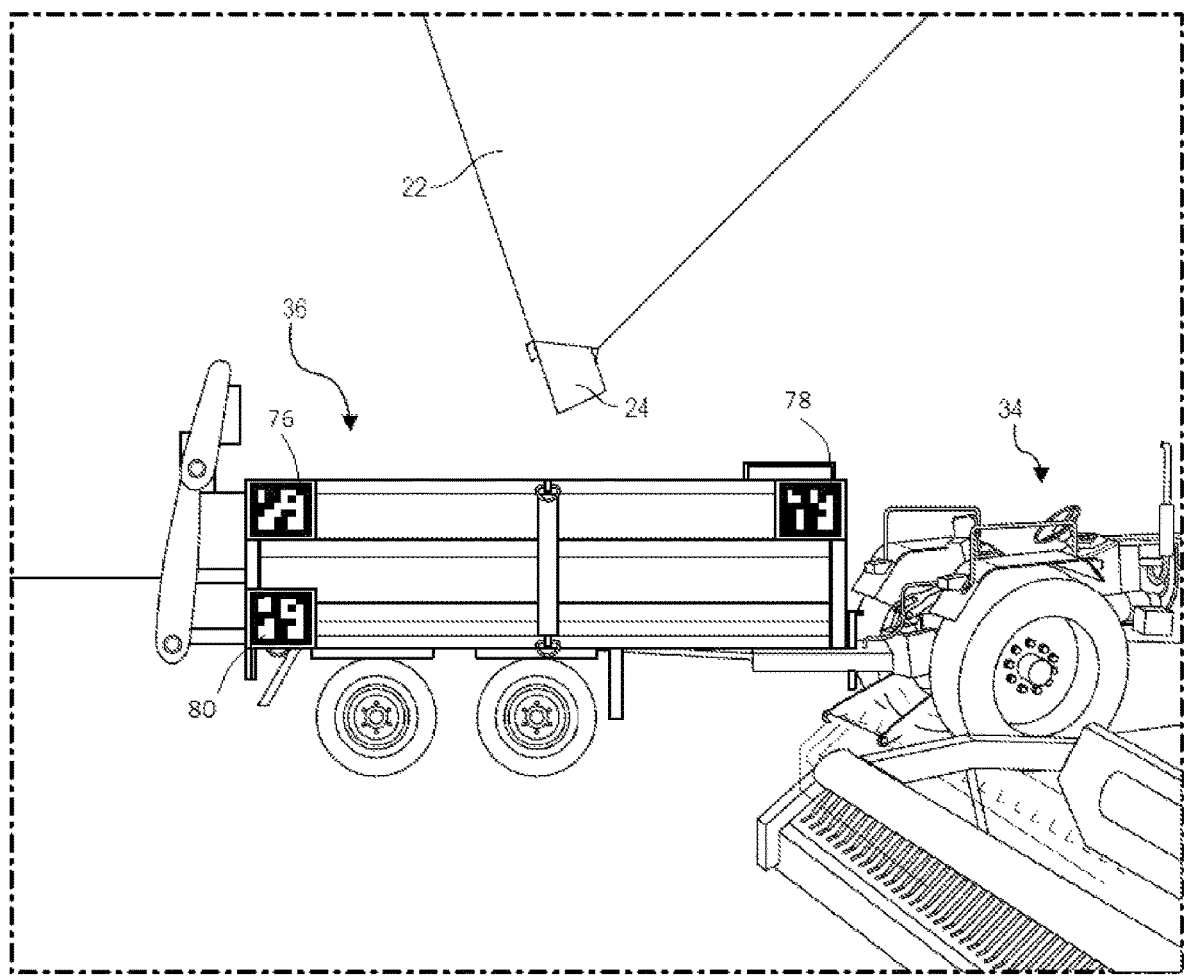
Figure 9:
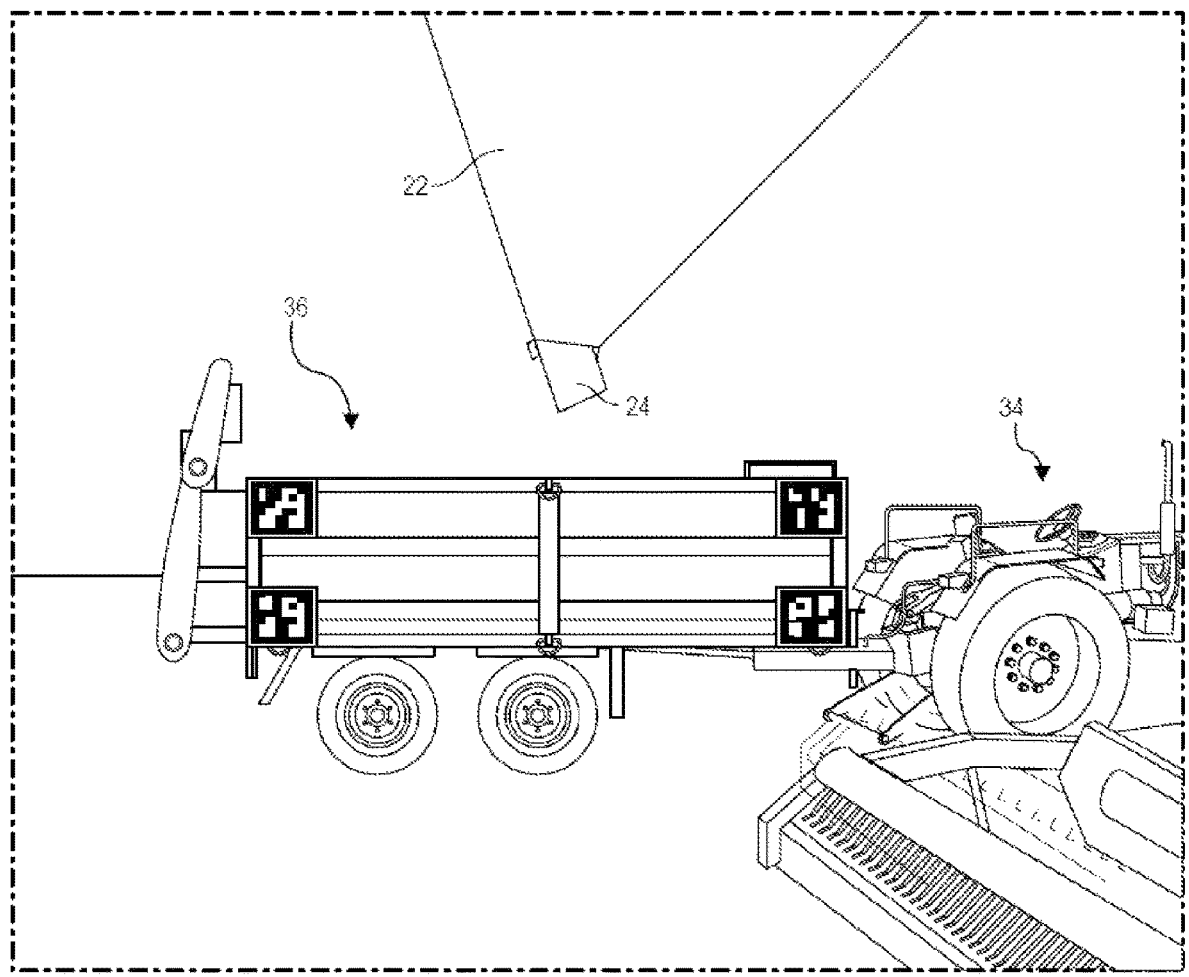

FIG. 7 illustrates another embodiment that includes a single visual marker 74 instead of two. The embodiment illustrated in FIG. 7 operates under the same principles as the embodiment using two markers except that when using a single marker the length of the grain cart 36 is not determined from the marker. FIG. 8 illustrates yet another embodiment that includes three visual markers 76, 78, 80 on the grain cart 36. The embodiment illustrated in FIG. 8 operates under the same principles as the embodiment using two markers except that using the three markers 76, 78, 80 three corners of the grain cart 36 can be identified and used to determine the size and position of the grain cart 36 relative to the agricultural harvester 10.

The markers 70, 72, 74, 76, 78, 80 may be permanently affixed to the grain cart 36 (or other receiving vehicle) or may be temporarily attached thereto using bolts, magnets or other fasteners. An advantage to temporarily attaching the markers to the receiving vehicle is that they can be quickly and easily removed from one receiving vehicle and attached to another.

During a harvest operation, the one or more computing devices continuously or periodically receive image data from the camera 28 and use the image data to detect the presence of the markers 70, 72 by detecting the patterns associated with each marker. Once the one or more computing devices have identified the markers 70, 72, they determine the location of the receiving vehicle relative to the harvester 10 using the size and location of the markers 70, 72 as explained above. The one or more computing devices may also use the size and location of the markers 70, 72 to determine the size of the receiving vehicle, the orientation of the receiving vehicle relative to the harvester 10, or both.

The one or more computing devices use the location of the receiving vehicle relative to the harvester 10 to generate a graphic representation of at least portions of the harvester 10 and the receiving vehicle that illustrate, in an intuitive way, the relative positions of the unload conveyor 22 and the grain bin of the receiving vehicle. The graphic representation is presented on a graphical user interface in the operator cabin of the tractor (or the harvester 10), typically located toward the front or side of the operator when he or she is facing forward, thereby allowing the operator to see the position of the grain bin relative to the unload auger and steer the tractor so that the grain bin is located beneath the spout of the unload conveyor. This relieves the operator(s) of the need to try to look backward to see the position of the unload conveyor while also watching the field ahead of the machine. The graphical representation has the further advantage of enabling the operator(s) to see the relative positions of the machines even in situations with limited visibility outside the operator cabin.

The one or more computing devices use the data generated by the camera 28 to generate graphic data defining a graphical representation illustrating the relative positions of the unload conveyor 22 and the grain bin 38. This graphical representation assists an operator in manually guiding either the tractor 34 or the harvester 10 to align the unload conveyor 22 with the grain bin 38.

The graphical representation may be presented on the user interface 48 of the harvester 10, on a user interface of the tractor 34, on a user interface of a portable electronic device such as a table computer or a smartphone, or on any combination thereof. As depicted in a first diagram of FIG. 10 the harvester 10 may be in wireless communication with the receiving vehicle wherein a computing device on the harvester 10 generates and communicates the graphical representation to the receiving vehicle as a wireless communication. The tractor includes an electronic system similar to that of the harvester 10 and illustrated in FIG. 2, as explained above, including a wireless gateway, a controller and a user interface. The harvester 10 communicates the graphic data via the wireless gateway of the harvester 10 and the tractor receives the graphic data via the wireless gateway of the tractor 34, wherein the user interface on the tractor 34 generates the graphical representation from the graphic data and presents the graphical representation to the operator on the user interface.

As depicted in a second diagram of FIG. 10 the harvester may be in wireless communication with the receiving vehicle and with a portable electronic device 94 wherein a computing device on the harvester 10 generates and communicates the graphical representation to the receiving vehicle, to the portable electronic device, or both as a wireless communication. The portable electronic device 94 may be placed in the operator cabin 26 of the harvester 10, in the operator cabin of the tractor 34, or another location that is not in the harvester 10 or in the tractor 34. The portable electronic device 94 receives the graphic data from the harvester 10 through a wireless transceiver on the portable electronic device.

The graphical representation is presented as part of a graphical user interface on a portable electronic device in FIGS. 11 and 12 for illustration purposes, with the understanding that the graphical representation may be presented on a display that is part of a display console in the receiving vehicle or in the harvester 10. The graphical representation of the grain cart 36, the harvester 10 and their relative positions enables the operator of the tractor 34 to guide the tractor to a location relative to the harvester 10 where the grain bin 38 of the grain cart 36 is properly aligned with the unload auger 22. The grain cart 36 and the harvester 10 are depicted in plan view (that is, from a perspective directly above the machines and looking down) so that the operator can clearly see from the graphic representation the relative positions of the grain cart and the harvester 10.

FIG. 12 depicts an alternative implementation of the graphical representation similar to that of FIG. 11 wherein the depiction of the grain cart and the harvester 10 includes concentric target lines 84 around the graphical depiction of the spout of the unload conveyor 22 to assist the operator in aligning the unload conveyor 22 with the grain bin.

A second embodiment of the invention is identical to the first embodiment described above, except that the location of the receiving vehicle relative to the harvester 10 is used to automatically guide the harvester 10, the tractor, or both to align the grain bin of the receiving vehicle with the unload conveyor 22 during an unload operation.

An agricultural harvester according to the second embodiment of the invention comprises a crop processor for reducing crop material to processed crop, an unload conveyor for transferring a stream of processed crop out of the agricultural harvester, a camera for capturing images of an area proximate the agricultural harvester and generating image data from the captured images. The harvester further includes one or more computing devices for receiving the image data from the camera, identifying, from the image data, a pre-determined visual marker corresponding to a receiving vehicle, determining, from the visual marker, a location of the receiving vehicle relative to the agricultural harvester, and generating automated navigation data based on the location of the receiving vehicle relative to the agricultural harvester, the automated navigation data to automatically control operation of at least one of the agricultural harvester and the receiving vehicle to align the unload conveyor with a grain bin of the receiving vehicle.

Automated guidance of a machine involves generating or acquiring a target travel path known as a wayline, determining a geographic location of the machine, comparing the machine's geographic location to the location of the wayline and automatically steering the machine to travel along the wayline. The wayline may be generated by an operator of the machine by, for example, designating a starting point and an ending point of the wayline or designing a start point and a direction of travel. The wayline may also be stored and retrieved from a previous operation, received from another agricultural machine or imported from an external computer device, such as an external computer running farm management software that generates the wayline. The wayline is represented by two or more geographic locations or points known as waypoints. The automated guidance system is part of the machine and is included in the electronic system described above. Automated guidance software stored in the storage component, for example, enables the controller to determine or acquire the wayline, determine the machine's location using the position determining component, compare the machine's location with the location of the wayline, and automatically steer the machine using data from the one or more sensors to determine a steering angle of the wheels and using the actuators to change the steering angle of the wheels, if necessary, to steer the machine to or along the wayline.

During operation the machine's geographic location is continuously determined using a GNSS receiver, and the location of a navigation point of the machine (for example, a point located between the rear wheels of a tractor or between the front wheels of a harvester) is continuously compared with the location of the wayline. Steering of the machine is automatically controlled so that the navigation point of the machine follows the wayline.

The automated guidance system of the tractor 34 automatically aligns the grain bin 38 of the grain cart 36 with the unload conveyor 22 by generating a wayline that corresponds to a path that will place the grain bin 38 beneath the spout 24 of the unload conveyor 22. By way of example, the one or more computing devices may determine from the data generated by the modules 28 and the camera 32 that the lateral distance of the grain cart 36 from the harvester 10 is seven meters. If the lateral distance required to align the grain bin 38 with the spout 24 is six meters, the automated guidance system of the tractor 34 generates a wayline that is one meter closer to the harvester 10 and steers the tractor 34 to follow the wayline. Similarly, if the one or more computing devices determine that the lateral distance is four meters, the automated guidance system of the tractor 34 generates a wayline that is two meters further away from the harvester 10 and steers the tractor 34 to follow the wayline.

The automated guidance system further controls the propulsion of the tractor 34 to shift the tractor's position forward or rearward relative to the harvester 10 to maintain a proper longitudinal position of the tractor 34 relative to the harvester 10 such that the grain cart 36 presents a proper front to back position relative to the unload conveyor 22. If the one or more computing devices determines that the grain cart 36 has a negative longitudinal offset relative to the harvester 10 (in other words, the position of the grain cart 36 is behind a desire position relative to the harvester 10) the automated guidance system causes the tractor 34 to speed up until it is at the desire position, then causes it to match the speed of the harvester 10. Similarly, if the one or more computing devices determines that the grain cart 36 has a positive longitudinal offset relative to the harvester 10 (in other words, the position of the receiving vehicle is ahead of a desire position relative to the harvester 10) the automated guidance system causes the tractor 34 to slow down until it is at the desire position, then causes it to match the speed of the harvester 10.

In the embodiments described above the harvester is a combine harvester. The harvester may also be a forage harvester, such as the self-propelled forage harvester 100 illustrated in FIGS. 13 and 14. The forage harvester 100 is supported by front 102 and rear 104 wheels. The forage harvester 100 connects to a header 106 suitable for harvesting maize, but may also be equipped with a windrow pick-up header or other type of header. The header 106 is provided for severing or picking up the crop off the ground and directing it to a series of feed rollers 108 that compact the raw crop material and advance it to one or more chopping drums 110. The chopped crop material follows a drum floor 112 to roller crackers 114 that crack grain kernels. From there the processed crop material is blown by a discharge blower 116 through a discharge chute 118 into a receiving vehicle, such as a silage wagon 120 pulled by a tractor 122. As used herein, the feed rollers 108, chopping drums 110 and roller crackers 114 constitute a crop processor that takes raw crop material (plants or portions of plants cut or picked up from the field) and reduce the raw crop material to processed crop material (chopped plant matter). Furthermore, the discharge chute 118 is a type of unload conveyor as used herein.

In operation the forage harvester 100 advances through a field cutting the crop 124 standing in the field and processes the crop as explained above. The processed crop is transferred from the forage harvester 100 to the wagon 120 by way of the discharge chute 118. A stream of processed crop 126 is blown through the chute 188 into the wagon 120. The tractor 122 and wagon 120 follow the forage harvester 100 through the field.

The forage harvester 100 includes an onboard electronic system with similar components and architecture to the system 42 described above including a controller, position determining device, user interface, sensors, actuators, storage components, input/output ports, a communications gate and a camera 128. The camera 128 may function in a similar or identical manner to the camera 28 described above, along with one or more computing devices, to detect and track a location of a receiving vehicle (such as the wagon 120) and at least one of the fill level and content distribution of crop material within the receiving vehicle. The data collected by the camera 128 is used to generate a graphical representation of the unload conveyor 116 of the harvester 100 and the receiving vehicle that is presented to an operator of either the harvester 100 or the tractor 122 by way of a graphical user interface as explained above. Alternatively or additionally, the data collected by the camera 128 may be used to generate guidance data used by at least one of the harvester 100 and the receiving vehicle to automatically guide at least one of the vehicles to maintain proper alignment of the unload conveyor 116 with the receiving vehicle.

As used herein, an "unload operation" includes transferring processed crop from a forage harvester to a silage wagon as illustrated in FIG. 14, and "grain cart" and "grain bin" include silage wagon and the bin of a silage wagon.

A schematic diagram of certain components of a portable electronic device 200 is illustrated in FIG. 15 and includes one or more computer processors 202, one or more memory and storage components 204, memory and storage controller circuitry 206, peripheral interface circuitry 208 and other hardware/circuitry 210 associated with user interface(s) (for example, a graphical user interface), input/output, sensors and communications (for example, wireless or wired network communications). The memory and storage component 204 stores computer software executable by the processor(s) 202, such as an operating system and applications, as well as data. The memory and storage controller 206 controls access to and communication with the memory 204 by the processor(s) 202 and the peripheral interface 208. When a software application is installed or run on the portable electronic device 200 the executable computer instructions, as well as the data, associated with the app are stored in the storage and memory components and executed by the processor(s). The processor(s) 202, the peripheral interface 208 and/or the hardware and circuitry 210 associated with the interface, I/O, sensors and communications enable a human-machine interface such as a touchscreen through which a user interacts with the device. The processor(s) 202, the peripheral interface 208 and/or the hardware and circuitry 210 associated with the interface, I/O, sensors and communications also enable communications with an external communications or computer network or with an external machine, such as the harvester 10.

Although the invention has been described with reference to the preferred embodiment illustrated in the attached drawing figures, it is noted that equivalents may be employed and substitutions made herein without departing from the scope of the invention as recited in the claims.

The claims at the end of this patent application are not intended to be construed under 35 U.S.C. § 112(f) unless traditional means-plus-function language is expressly recited, such as "means for" or "step for" language being explicitly recited in the claim(s).

Having thus described the preferred embodiment of the invention, what is claimed as new and desired to be protected by Letters Patent includes the following:

The invention claimed is:

1. A system comprising:
an agricultural harvester comprising:
a crop processor for reducing crop material to processed crop;
an unload conveyor for transferring a stream of processed crop out of the agricultural harvester;
a first controller; and
a camera for capturing images of an area proximate the agricultural harvester and generating image data from the captured images;
a receiving vehicle comprising:
a grain bin for storing processed crop received from the agricultural harvester;
a visual marker; and
a second controller,
wherein the first controller is configured to:
receive the image data from the camera;
identify, from the image data, a visual marker corresponding to the receiving vehicle; and
determine, from the visual marker, a location of the receiving vehicle relative to the agricultural harvester; and
wherein the second controller is configured to:
receive the location data from the first controller; and
use the location data to generate a graphical representation of the relative locations of the unload conveyor and at least a portion of the receiving vehicle, the graphical representation based on the location data; and
an electronic device including a graphical user interface, the electronic device for presenting, on the graphical user interface, the graphical representation of the relative locations of the unload conveyor and at least a portion of the receiving vehicle.

2. The system as set forth in claim 1, wherein the first controller is further configured to:
identify, from the image data, a plurality of visual markers corresponding to the receiving vehicle;
determine, from the plurality of visual markers, the location of the receiving vehicle relative to the agricultural harvester; and
determine the location of the receiving vehicle using the plurality of visual markers.

3. The system as set forth in claim 2, wherein the controller is further configured to:

associate a first one of the plurality of visual markers with a front of the receiving vehicle to determine a location of the front of the receiving vehicle relative to the agricultural harvester;
associate a second one of the plurality of visual markers with a rear of the receiving vehicle to determine a location of the rear of the receiving vehicle relative to the agricultural harvester; and
determine the location of the receiving vehicle relative to the agricultural harvester using the locations of the front and the rear of the receiving vehicle.

4. The system as set forth in claim 2, wherein the controller is further configured to:
associate a first one of the plurality of visual markers with a first corner of the receiving vehicle to determine a location of the first corner relative to the agricultural harvester;
associate a second one of the plurality of visual markers with a second corner of the receiving vehicle to determine a location of the second corner relative to the agricultural harvester; and
determine the location of the receiving vehicle relative to the agricultural harvester using the locations of the first and second corners of the receiving vehicle.

5. The agricultural harvester as set forth in claim 4, wherein the controller is further configured to:
associate a third one of the plurality of visual markers with a third corner of the receiving vehicle to determine a location of the third corner relative to the agricultural harvester, and
determine the location of the receiving vehicle relative to the agricultural harvester using the locations of the first, second and third corners of the receiving vehicle.

6. The agricultural harvester as set forth in claim 1, wherein the controller is further configured to determine the location of the receiving vehicle relative to the agricultural harvester by identify a pattern on the visual marker and using the pattern to determine a distance between the agricultural harvester and the receiving vehicle.

7. A system comprising:
an agricultural harvester comprising:
a crop processor for reducing crop material to processed crop;
an unload conveyor for transferring a stream of processed crop out of the agricultural harvester;
a first controller;
a first communications gateway for sending and receiving wireless signals; and
a camera for capturing images of an area proximate the agricultural harvester and generating image data;
a receiving vehicle comprising:
a grain bin for storing processed crop received from the agricultural harvester;
a visual marker;
a second controller; and
a second communications gateway for sending and receiving wireless signals,
wherein the first controller is configured to:
receive the image data from the camera;
identify, from the image data, the visual marker;
generate, from the visual marker, location data indicating a location of the receiving vehicle relative to the agricultural harvester; and
communicate the location data to the receiving vehicle using the first communications gateway, and
wherein the second controller is configured to:
receive the location data using the second communications gateway, and
use the location data to generate a graphical representation of the relative locations of the unload conveyor and at least a portion of the receiving vehicle, the graphical representation based on the location data.

8. The system as set forth in claim 7, wherein:
wherein the visual marker comprises a plurality of visual markers, and
wherein the first controller is further configured to:
identify, from the image data, the plurality of visual markers, and
generate, from the plurality of visual markers, the location data.

9. The system as set forth in claim 8, wherein the first controller is further configured to:
associate a first one of the plurality of visual markers with a front of the receiving vehicle to determine a location of the front of the receiving vehicle relative to the agricultural harvester;
associate a second one of the plurality of visual markers with a rear of the receiving vehicle to determine a location of the rear of the receiving vehicle relative to the agricultural harvester; and
generate the location data using the locations of the front and the rear of the receiving vehicle.

10. The system as set forth in claim 8, wherein the first controller is further configured to:
associate a first one of the plurality of visual markers with a first corner of the receiving vehicle to determine a location of the first corner relative to the agricultural harvester;
associate a second one of the plurality of visual markers with a second corner of the receiving vehicle to determine a location of the second corner relative to the agricultural harvester; and
generate the location data using the locations of the first and second corners of the receiving vehicle.

11. The system as set forth in claim 10, wherein the first controller is further configured to:
associate a third one of the plurality of visual markers with a third corner of the receiving vehicle to determine a location of the third corner relative to the agricultural harvester; and
generate the location data using the locations of the first, second and third corners of the receiving vehicle.

12. The system as set forth in claim 7, wherein the first controller is further configured to generate the location data by identify a pattern on the visual marker and using the pattern to determine a distance between the agricultural harvester and the receiving vehicle.

13. The system as set forth in claim 7, wherein the agricultural harvester comprises a combine harvester.

14. A method comprising:
providing:
an agricultural harvester comprising:
a crop processor for reducing crop material to processed crop;
an unload conveyor for transferring a stream of processed crop out of the agricultural harvester;
a first controller;
a first communications gateway for sending and receiving wireless signals; and
a camera for capturing images of an area proximate the agricultural harvester and generating image data;

a receiving vehicle comprising:
  a grain bin for storing processed crop received from the agricultural harvester;
  a visual marker;
  a second controller; and
  a second communications gateway for sending and receiving wireless signals,
capturing images of an area proximate the agricultural harvester using the camera of the agricultural harvester and generating image data from the capture images;
identify from the image data, using the first controller of the agricultural harvester, the visual marker of the receiving vehicle;
determining from the visual marker, using the first controller, a location of the receiving vehicle relative to the agricultural harvester; and
generating, using the second controller of the receiving vehicle, a graphical representation of the relative locations of the unload conveyor and at least a portion of the receiving vehicle, the graphical representation based on the location of the receiving vehicle relative to the agricultural harvester.

15. The method as set forth in claim 14, further comprising:
identify from the image data, using the first controller, a plurality of visual markers of the receiving vehicle;
determining from the plurality of visual markers, using the first controller, the location of the receiving vehicle relative to the agricultural harvester; and
generating, using the second controller, automated navigation data based on the plurality of visual markers.

16. The method as set forth in claim 15, further comprising:
associating, using the first controller, a first one of the plurality of visual markers with a front of the receiving vehicle to determine a location of the front of the receiving vehicle relative to the agricultural harvester;
associating, using the first controller, a second one of the plurality of visual markers with a rear of the receiving vehicle to determine a location of the rear of the receiving vehicle relative to the agricultural harvester; and
determining, using the first controller, the location of the receiving vehicle relative to the agricultural harvester using the locations of the front and the rear of the receiving vehicle.

17. The method as set forth in claim 15, further comprising:
associating, using the first controller, a first one of the plurality of visual markers with a first corner of the receiving vehicle to determine a location of the first corner relative to the agricultural harvester;
associating, using the first controller, a second one of the plurality of visual markers with a second corner of the receiving vehicle to determine a location of the second corner relative to the agricultural harvester; and
determining, using the first controller, the location of the receiving vehicle relative to the agricultural harvester using the locations of the first and second corners of the receiving vehicle.

18. The method as set forth in claim 17, further comprising:
associating, using the first controller, a third one of the plurality of visual markers with a third corner of the receiving vehicle to determine a location of the third corner relative to the agricultural harvester; and
determining, using the first controller, the location of the receiving vehicle relative to the agricultural harvester using the locations of the first, second and third corners of the receiving vehicle.

19. The method as set forth in claim 14, further comprising determining, using the first controller, the location of the receiving vehicle relative to the agricultural harvester by identifying a pattern on the visual marker and using the pattern to determine a distance between the agricultural harvester and the receiving vehicle.

* * * * *